United States Patent [19]

Hayashi

[11] Patent Number: 5,437,223
[45] Date of Patent: Aug. 1, 1995

[54] MEANS FOR CLOSING THE SEAM OF A ROLLED DOUGH BODY

[75] Inventor: Torahiko Hayashi, Utsunomiya, Japan

[73] Assignee: Rheon Automatic Machinery Co., Ltd., Utsunomiya, Japan

[21] Appl. No.: 177,053

[22] Filed: Jan. 4, 1994

[30] Foreign Application Priority Data

Jan. 16, 1993 [JP] Japan .................................. 5-021930

[51] Int. Cl.⁶ .............................................. A21C 11/00
[52] U.S. Cl. ..................................... 99/450.1; 425/319
[58] Field of Search ................ 99/450.1, 450.2, 450.3, 99/450.4, 450.5, 450.6, 450.7, 450.8; 425/319, 320, 322

[56] References Cited

U.S. PATENT DOCUMENTS

| | | | |
|---|---|---|---|
| 2,905,105 | 9/1959 | Lombi | 425/322 |
| 4,171,197 | 10/1979 | Sato | 99/450.2 |
| 4,457,225 | 7/1984 | Bakker | 99/450.1 |
| 4,557,940 | 12/1985 | Suzuki | 425/319 |
| 5,292,539 | 3/1994 | Tashiro et al. | 99/450.1 |

*Primary Examiner*—David A. Scherbel
*Assistant Examiner*—Reginald L. Alexander
*Attorney, Agent, or Firm*—Guy W. Shoup; Patrick T. Bever

[57] ABSTRACT

An apparatus for closing the seam of a wound bar-shaped dough body being conveyed on a conveyor, comprising a pair of standing conical rolls mounted over and across the conveyor, between which rolls the dough body is made to travel. This simple mechanism makes it much easier to automatically provide high-quality bar-shaped products.

6 Claims, 5 Drawing Sheets

MEANS FOR CLOSING THE SEAM OF A ROLLED DOUGH BODY

BACKGROUND OF THE INVENTION

1. Field of the Invention

This invention relates to an apparatus for preventing the unwinding of a bar-shaped dough body that has been produced by winding a sheet of dough. More especially, it relates to an apparatus for closing the seam of a dough body.

2. Prior Art

Japanese Utility Model Early-Publication No. 64-52471 discloses a prior-art apparatus that aims to prevent the unwinding of a wound bar-shaped dough body. As shown in FIGS. 13 and 14 of the publication, the apparatus comprises two rotating vertical rolls above a conveyor and one rotating horizontal roll above the vertical rolls. A wound bread dough bar is passed through a rectangular space surrounded by the rolls to form a substantially rectangular-shaped bar of bread dough.

As shown in FIG. 10, as the space formed by the prior-art rolls has a rectangular cross section, only a weak force can be exerted to make the outer edge part of the wound bar-shaped dough body adhere to the adjacent body part. Even if the outer edge part is pressed against the adjacent part of the body at a point near a corner of the rectangular space, not to mention a straight part of the rectangular space, the pressing force is not concentrated enough to have the edge part securely adhere to the adjacent body part. Thus, in this conventional apparatus the pressing force is weak, so that the edge part comes off its adjacent body part after the body is shaped.

Thus, half-finished bar-shaped dough products, such as those for French bread, that have been wound using the prior-art technique, tend to be unwound at the seam of the wound dough body, into spindle-shaped pieces of bread, when they are shaped or baked, forming rejects. The reason is that the unwinding force is exerted along the line where the edge longitudinally overlaps the periphery of a cut dough piece. This causes an unwinding in a width-wise direction. The maximum force occurs at the center, since both of its ends have been compacted by the cutting process. Thus a spindle-like form results. That is, the bread made by winding a dough sheet cannot have a seam that is closed tightly enough to be acceptable as a product free of deformation caused by the unwinding.

SUMMARY OF THE INVENTION

One object of this invention is to provide an apparatus through which the edge part of a wound bar-shaped dough body can be securely fastened to the inner layer of the dough body.

Another object of this invention is to provide an apparatus in which the edge part of a continuously wound bar-shaped dough body is tightly fastened to the inner layer of the dough body, to produce a neatly formed bar-shaped dough piece of high quality.

A further object of this invention is to provide an apparatus wherein a high-quality bar-shaped dough piece that is a coil in cross section can be easily and automatically produced with a better yield and fewer rejects.

This invention has resolved the above-mentioned problem of the unwinding of a wound bar-shaped dough body by providing side-by-side a pair of conical rolls above a conveyor that conveys the bar-shaped dough body, and by forcing the bar-shaped dough body through a V-shaped groove formed by the two rolls therebetween.

That is, this invention provides an apparatus for closing the seam of a wound dough body in a device for manufacturing a bar-shaped dough body from a dough sheet conveyed on a conveyor, by winding it from one side thereof by a winding device. It is characterized by a pair of conical rolls rotatably fixed relative to a frame so that the rolls are disposed above the conveyor and downstream of the winding device, with their shafts positioned vertically, the rolls rotating in the downstream direction where the rolls face each other and being placed in such a positional relationship that they press the dough body conveyed therebetween.

When the bar-shaped dough body passes through the V-shaped groove formed by the two conical rolls, the dough body is pulled toward the bottom of the groove due to the characteristics of the conical rolls, wherein the larger the diameter the faster the peripheral speed, so that the seam part of the wound dough body is drawn and pressed into the bottom of the narrow groove to be securely closed. As a result, the outer edge part of the wound dough body forming the outer layer of the edge part sticks firmly to the inner layer of that body so that the unwinding of the wound dough body is entirely eliminated.

DESCRIPTION OF THE PREFERRED EMBODIMENTS

The seam-closing apparatus of this invention will now be explained based on one of the embodiments of this invention.

Figure 1:
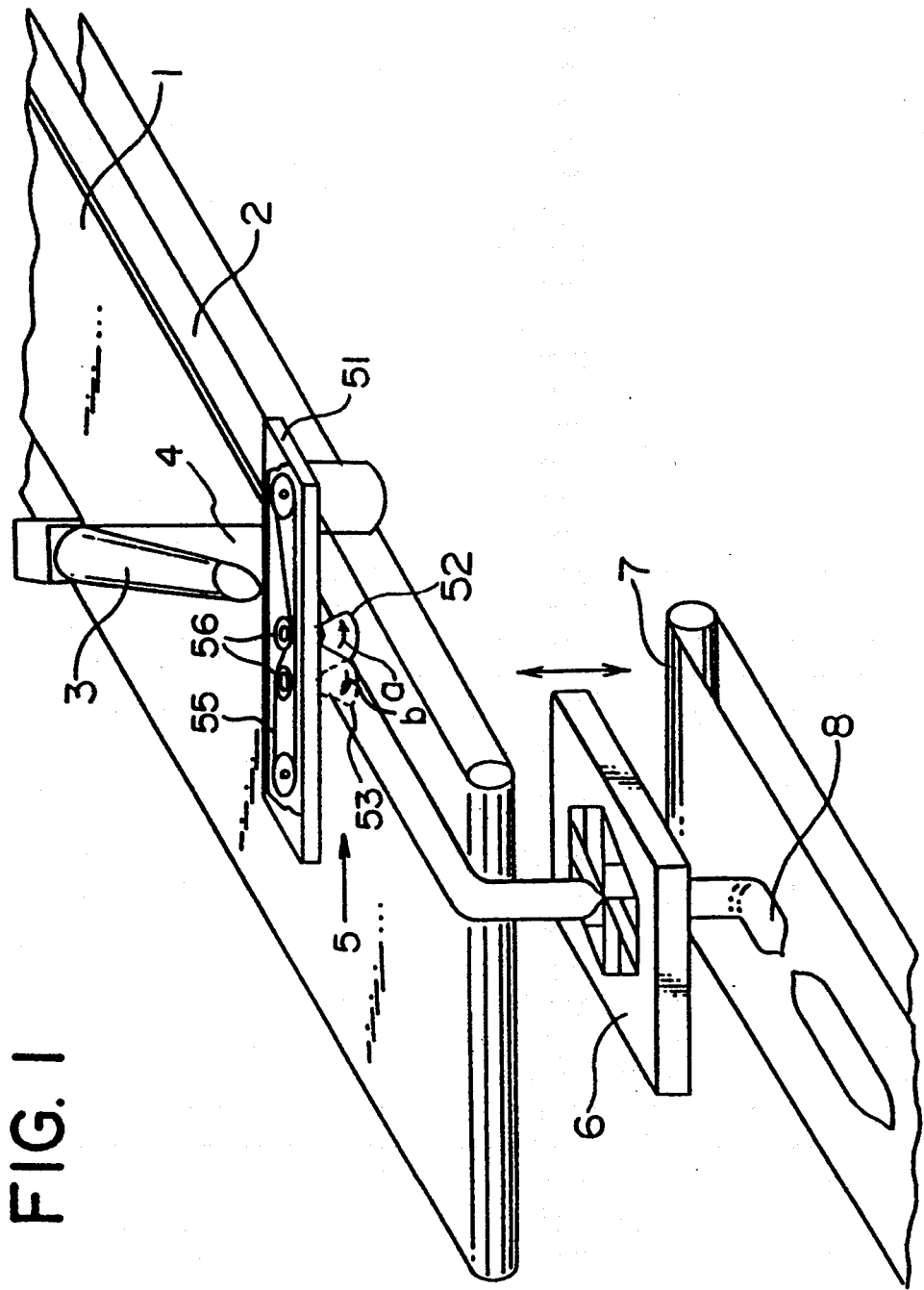
FIG. 1 is a perspective view of the device for manufacturing bar-shaped dough pieces using the seam-closing apparatus of this invention.
Figure 2:
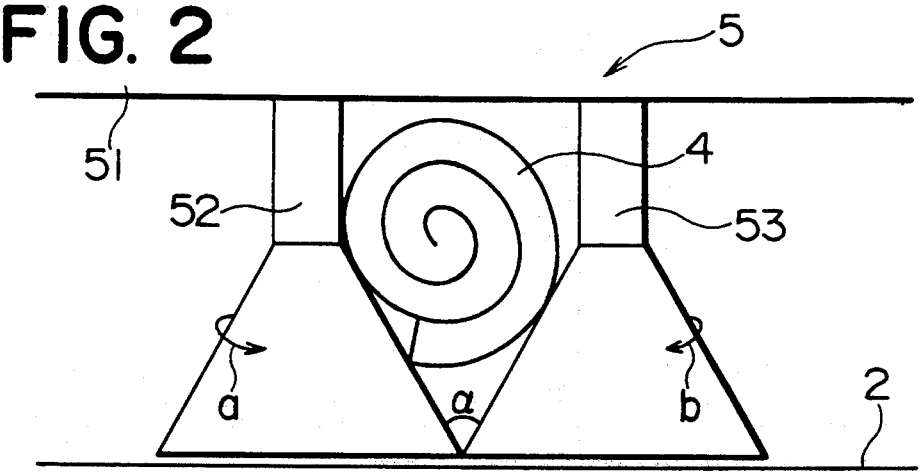
FIGS. 2–4 are front views of the conical rolls showing the seam-closing process of the first embodiment of this invention.

In FIGS. 1 and 2 a winder formed as a pivotable roll 3 is mounted on the frame of the device and extends over the top of a first conveyor 2 conveying a sheet of dough 1. A seam-closing apparatus 5 is above the conveyor belt 2, at a path along which a bar-shaped dough body 4 is conveyed. The path is downstream of the winder 3.

The seam-closing apparatus 5, although it is only schematically shown in FIG. 1, consists of a left conical roll 52 and a right conical roll 53, both of which rotatably hang from a beam 51. The beam 51 is mounted on the frame and bridges the two conical rolls 52,53. The left roll 52 is on the left side of the path for the dough body 4 conveyed and the right roll 53 on the right side, viewed from upstream of the rolls.

The left conical roll 52 has the same size and shape as those of the right conical roll 53. The upper part of each of the conical rolls is a cylinder. The lower part of each roll is a truncated cone. The lowest part of each roll has the largest diameter and lies near the first conveyor 2 with the periphery of one of the rolls positioned adjacent to that of the other at the lowest part. They may contact each other.

Inside the beam 51 is installed a conventional mechanism consisting of a chain 55 and sprockets 56 for rotating the left roll 52 and the right roll 53 so that the rolls are rotated in the direction shown by the arrows a,b. In other words, the rolls rotate in the downstream direction where they face each other.

A cutting and shaping apparatus 6 that is movable up and down, such as the one shown in U.S. Pat. No. 4,734,024, is provided under the downstream end of the first conveyor 2 to produce half-finished products 8. A second conveyor 7 is disposed under the cutting and shaping apparatus 6 to convey the half-finished products 8 to the next process.

Based on the first embodiment, which is explained above, the process of closing the seam of a wound bar-shaped dough body will now be explained.

The dough sheet 1 is wound by the winder 3 into a spiral to provide a bar-shaped dough body 4. This dough body 4 is then made to pass between the conical rolls 52,53 and forced into the V-shaped groove formed by the conical parts of the rolls. In contrast to the rectangular groove formed by the prior-art apparatus, the distance between the two sides of the V-shaped groove formed by the apparatus of this invention decreases towards its bottom. Since when viewed from the top the left roll 52 rotates counterclockwise and the right roll 53 rotates clockwise, as shown by arrows a,b, and rotate inwardly, tangential forces are exerted on the bar-shaped dough body 4 by the conical surfaces. Because of the increased velocity of rotation at the lower part of the conical rolls, the dough progresses downward, and is compressed into the bottom of the groove.

Figure 3:
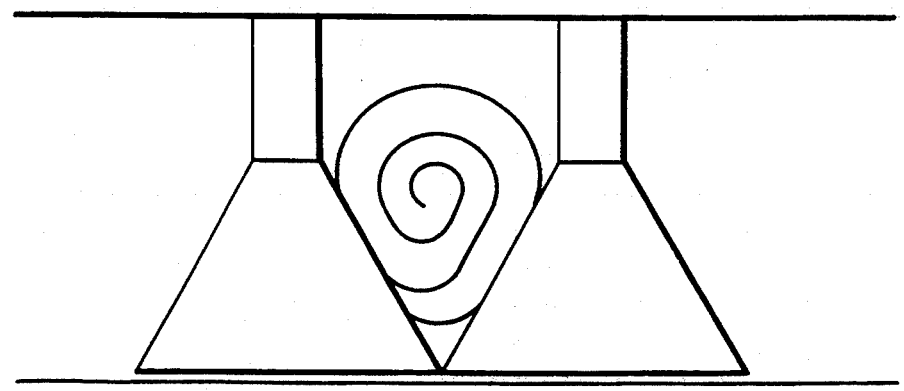
Figure 4:
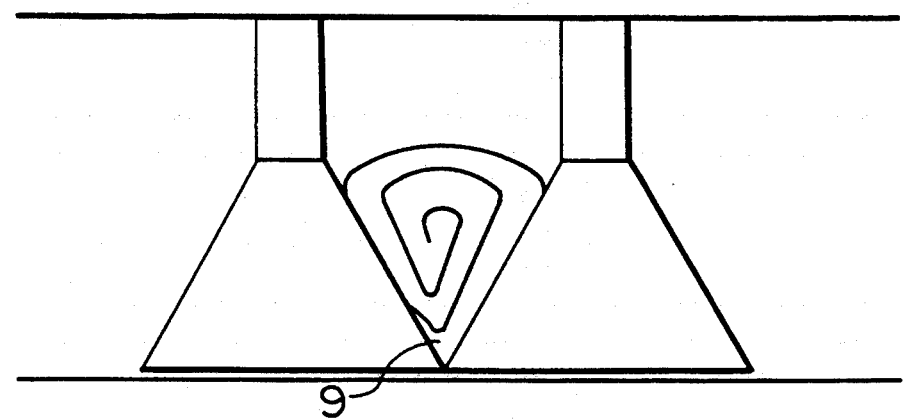

As shown in FIGS. 2–4, the bar-shaped dough body 4 is pulled toward a point on the conical surface where it has a higher peripheral speed, namely, where the roll has a larger sectional diameter. As a result, the bar-shaped dough body 4 is forced into the bottom of the V-shaped groove having an angle $\partial$, preferably an acute angle (FIG. 2) formed by the conical surfaces. Thus, the bar-shaped dough body is highly compacted in comparison to that made by the above-mentioned prior-art mechanism, so that the edge part is tightly fastened to the inner layer of the body part.

In the seam-closing process the dough body is introduced into the space between the conical rolls such that the edge part of the dough body 4 is positioned at the lower side thereof so that it abuts the surface of a conical roll.

As shown in detail in FIG. 2, it is preferable to place the edge part so that it is slightly spaced apart from the lowest point in the direction converse to the direction of the spiral of dough, namely, in the clockwise direction in FIG. 2, so that the edge part is made to contact some part of the conical surface of a roll. The edge part is thus deformed into a hook 9 (FIG. 4), and securely sticks to the inner layer of the dough body 4 when the seam-closing is completed, as shown in FIG. 4.

Figure 5:
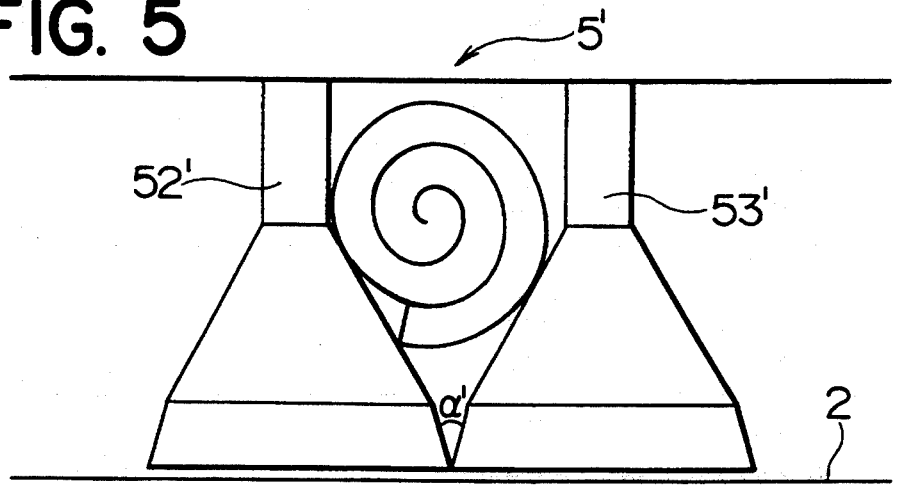
FIGS. 5–7 are front views of the conical rolls showing the seam-closing process of the second embodiment of this invention.
Figure 6:
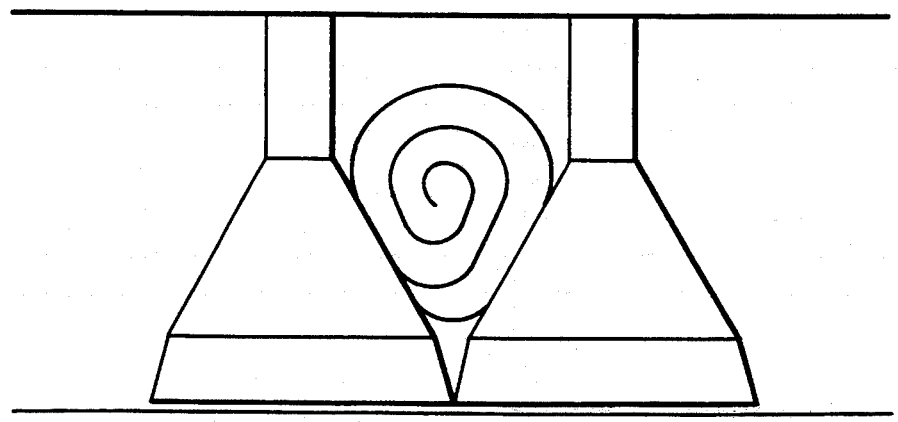
Figure 7:
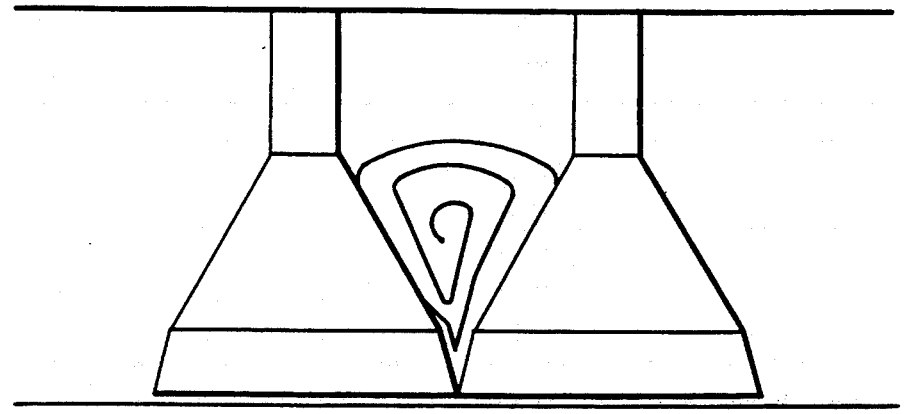

FIGS. 5–7 shows the second embodiment of this invention. It uses a pair of conical rolls 52',53' comprising two slant surfaces with different angles of inclination. The lowest part of the slant surfaces has a sharper acute angle than that of the surface above it. The thus-formed V-shaped groove can have an angle $\partial'$, sharper than the angle $\partial$ made by the first embodiment, so that the edge part of the dough body can be more securely pressed into the groove and adhere to the inner layer of the seam, as shown in FIG. 7. The second embodiment is used when the seam closing given by the first embodiment is insufficient. There can be more than two slant surfaces, and each can have a different angle of inclination.

Figure 8:
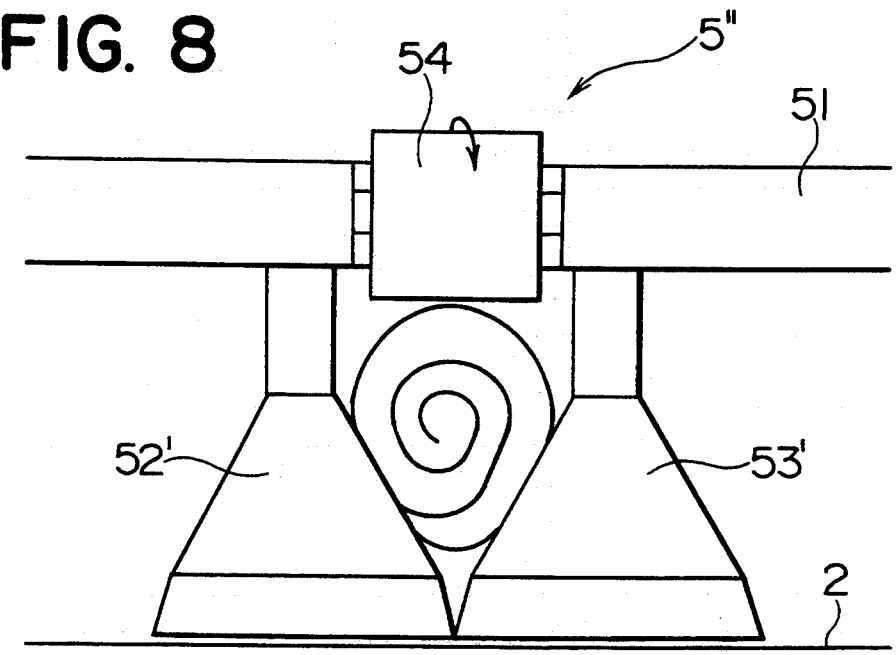
FIGS. 8 and 9 are front views of the conical rolls and a horizontal roll showing the seam-closing process of the third embodiment of this invention.
Figure 9:
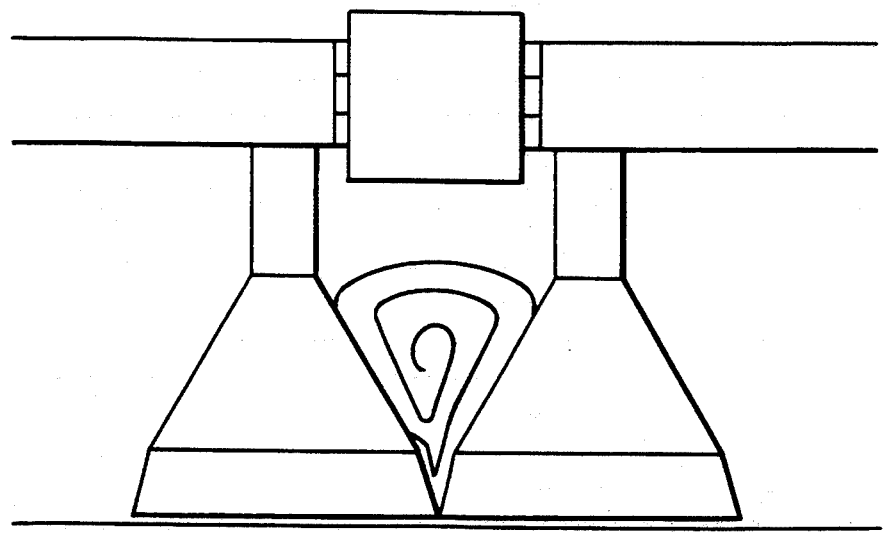
Figure 10:
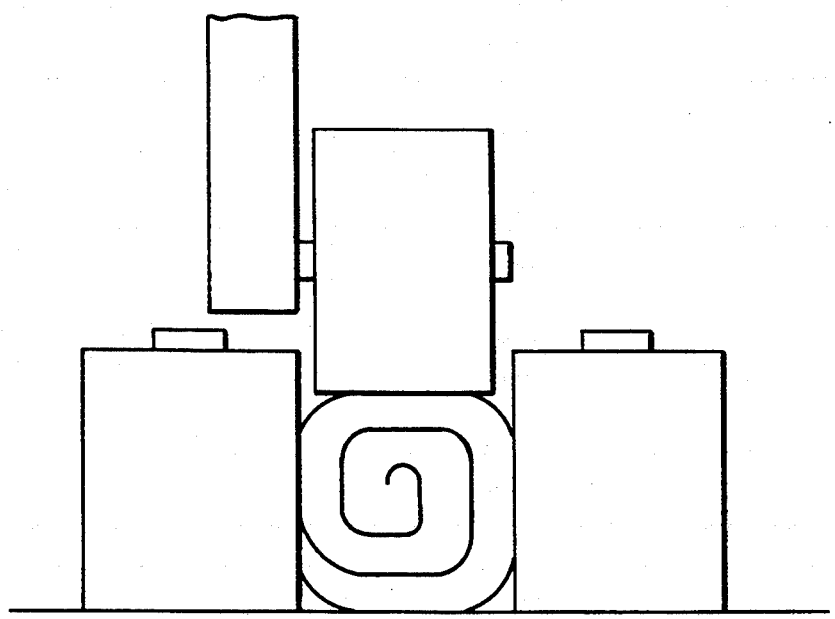
FIG. 10 is a view of a prior art roll arrangement.

FIGS. 8 and 9 show the third embodiment of this invention. In it at least one upper horizontal roll 54 is also provided above a pair of conical rolls 52',53' to help the pressing of the conical rolls. The horizontal roll 54 is rotatable and may be provided on the beam 51. Thus, the wound bar-shaped dough is sufficiently pressed against the conical surfaces so that the pulling-in operation through the conical slopes can be carried out more effectively. This is especially effective when the elasticity of the dough is strong.

EFFECTS OF THE INVENTION

The quality of the bread and cakes that are manufactured by winding a sheet of dough into a bar-shaped body and then by dividing and shaping the wound dough bar is superior to those manufactured through extrusion. Therefore, this invention makes providing high-quality products much easier by increasing the yield thereof through further lowering the number of rejects. Further, this invention makes possible an increase in an array of saleable food products from an automated production line.

I claim:

1. An apparatus for closing a seam of a wound dough body in a device for manufacturing the wound dough body from a dough sheet, one edge of the dough sheet forming the seam of the wound dough body, the apparatus comprising:

a frame;

a conveyor mounted on the frame and having an upper surface for conveying the dough sheet;

a winding device disposed above the upper surface of the conveyor for forming the wound dough body by winding the dough sheet from a first side of the conveyor to a second side of the conveyor;

first and second conical rolls rotatably fixed to the frame such that the rolls are disposed above the upper surface of the conveyor and downstream of the winding device; and means for rotating the first and second rolls such that the first and second rolls rotate in a downstream direction at a point at which the rolls face each other;

wherein the first and second rolls are placed in such a closely-spaced positional relationship that the first and second rolls support the wound dough body conveyed therebetween, whereby conical surfaces of the first and second rolls press the seam against the dough body.

2. An apparatus of claim 1, wherein each conical roll has a plurality of slant surfaces with different angles of inclination relative to the upper surface of the conveyor.

3. An apparatus of claim 1, wherein each conical roll comprises a wide base facing the conveyor, a tapered portion fixedly connected to the wide base and extending away from the conveyor, and a shaft connected to the tapered portion and rotatably connected to the frame, each shaft being perpendicular to the conveyor.

4. An apparatus of claim 3, wherein at least one horizontally rotatable roll is mounted to the frame and located above and between the first and second conical rolls such that the horizontally rotatable roll contacts the dough body passing between the first and second conical rolls.

5. An apparatus of claim 2, wherein each conical roll includes a wide base facing the upper surface of the conveyor, a tapered portion fixedly connected to the wide base and extending away from the conveyor, and a shaft connected to the tapered portion and rotatably connected to the frame, wherein the shafts of the first and second conveyors are parallel to each other and perpendicular to the conveyor.

6. An apparatus of claim 5, wherein the base of the first conical roll contacts the base of the second conical roll.

* * * * *